(12) United States Patent
Beall et al.

(10) Patent No.: US 6,297,179 B1
(45) Date of Patent: Oct. 2, 2001

(54) TRANSITION-METAL, GLASS-CERAMIC GAIN MEDIA

(75) Inventors: George H. Beall, Big Flats; Nicholas F. Borrelli; Eric J. Mozdy, both of Elmira; Linda R. Pinckney, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/686,564

(22) Filed: Oct. 11, 2000

Related U.S. Application Data

(60) Provisional application No. 60/160,053, filed on Oct. 18, 1999.

(51) Int. Cl.[7] ........................... C03C 10/04; C03C 10/02; C03C 13/04
(52) U.S. Cl. ................... 501/5; 501/10; 501/37; 252/301.4 R; 252/301.4 F; 372/6; 372/40; 385/141
(58) Field of Search ..................... 501/5, 10, 37; 252/301.4 R, 301.4 F; 372/6, 40, 39; 385/141

(56) References Cited

U.S. PATENT DOCUMENTS

| | | | |
|---|---|---|---|
| 4,987,575 | | 1/1991 | Alfano et al. ........................ 372/41 |
| 5,504,771 | * | 4/1996 | Vahala et al. ........................ 372/94 |
| 5,670,086 | * | 9/1997 | Papadopoulos et al. ...... 252/301.4 P |
| 5,717,517 | * | 2/1998 | Alfano et al. ........................ 359/342 |
| 6,118,575 | * | 9/2000 | Grubb et al. ........................ 359/337 |
| 6,181,465 | * | 1/2001 | Grubb et al. ........................ 359/337 |

* cited by examiner

*Primary Examiner*—Karl Group
(74) *Attorney, Agent, or Firm*—Vincent T. Kung

(57) ABSTRACT

A gain medium for use in optical amplifiers or laser oscillators is disclosed. The gain medium includes a transition-metal doped glass-ceramic material having a crystal phase and a glass phase. The crystal phase is formed in situ in the glass phase, with the transition metal ions preferentially partitioning into the crystals from the glass phase. The crystals so formed have a size of less than 50 nm, and the transition metal ions within them are capable of lasing at a wavelength within the range of about 900 to 3000 nm. Also disclosed are amplifier and laser oscillator configurations, where the glass-ceramic gain medium is applied in a variety of configurations. Also disclosed is a method of amplifying a signal of light wherein the glass-ceramic gain medium is pumped with light energy so as to excite the transition metal ions, and the signal of light is transmitted through the gain medium while the transition metal ions are excited, whereby the signal of light is amplified. Also disclosed is a method of producing laser oscillation wherein the glass-ceramic gain medium is included in a laser cavity, pumped with optical energy to excite the transition metal ions, and the resulting radiation is forced to oscillate by the use of reflecting surfaces for feedback.

43 Claims, 3 Drawing Sheets

TRANSITION-METAL, GLASS-CERAMIC GAIN MEDIA

CROSS-REFERENCE TO RELATED APPLICATIONS

An application entitled GLASS-CERAMICS BASED ON ALPHA-AND BETA-WILLEMITE, filed as a U.S. Provisional Application Serial No. 60/160,138, on Oct. 18, 1999, in the name of Linda R. Pinckney, and assigned to the same assignee as this application, is directed to a substantially transparent, alpha- and beta-willemite glass-ceramic which may be doped with transition-metals to impart optical activity thereto.

An application entitled TRANSPARENT (LITHIUM, ZINC, MAGNESIUM) ORTHOSILICATE GLASS-CERAMICS, filed as a U.S. Provisional Application Serial No. 60/159,967, on Oct. 18, 1999, in the names of George H. Beall and Linda R. Pinckney, and assigned to the same assignee as this application, is directed to transition-metal-doped, glass-ceramic materials that exhibit properties that make them suitable as gain media in optical amplifiers and/or laser pumps.

An application entitled GLASS-CERAMIC FIBER AND METHOD, filed as United States Provisional Application Serial No. 60/160,052 on Oct. 18, 1999 in the names of George H. Beall, Linda R. Pinckney, William Vockroth and Ji Wang and assigned to the same assignee as this application, is directed to glass-ceramic materials containing nanocrystals and being doped with a transition metal, and to a method of producing such glass-ceramics in the form of optical fibers.

An application entitled TRANSPARENT AND TRANSLUCENT FORSTERITE GLASS-CERAMICS, filed as U.S. Provisional Application Serial No. 60/160,093 filed on Oct. 18, 1999, in the names of George H. Beall, and of U.S. Supplemental Provisional Application Serial No. 60/174,012 having the same title and filed Dec. 30,1999 by George H. Beall.

The present application claims the benefit of U.S. Provisional Application Serial No. 60/160,053 filed on Oct. 18, 1999, entitled TRANSITION-METAL GLASS-CERAMIC GAIN MEDIA, in the names of George H. Beall, Nicholas F. Borrelli, Eric J. Mozdy and Linda R. Pinckney.

FIELD OF THE INVENTION

The present invention relates generally to glass-ceramic materials as gain media and, more particularly, to glass ceramic materials that contain transition metal dopant throughout and that exhibit properties making them suitable as gain media for use in optical amplifiers and/or laser pumps. The term "gain media" as used herein refers to an optical component which produces optical fluorescence and is capable of amplifying an optical signal in the same wavelength range as the optical fluorescence.

BACKGROUND OF THE INVENTION

Over the past few decades, fiber optic systems have become the standard for long-distance communication. This preponderance stems from several advantages of optical links over the more traditional, metallic-based counterparts. These include lower loss, higher information capacity, low cost per channel, immunity to crosstalk and electrical interference, and a smaller physical mass. Currently, optical fiber systems carry hundreds of terabits per second over distances >1000 km. Even though this is orders of magnitude beyond the capability of metallic links, the demands of global communication are driving the system capacity to double every year.

A single-channel, fiber optic communication link necessarily includes a transmitter, optical fiber, and receiver. The transmitter converts electrical information to an optical signal by means of a modulated optical source, such as a laser. The laser can be directly modulated, or the information can be imparted to the continuous output of the laser by an external modulator. Light from the transmitter is then sent along the optical fiber to be ultimately detected by the receiver, a semiconductor which converts the optical signal back to the original electronic one.

Where the distance of communication is great, amplifiers must be included at some point in the link to strengthen the signal. In the early days of optical fiber communication, this required prematurely converting the signal to an electrical one, electrically amplifying the information, then retransmitting the amplified signal along the fiber. In order to achieve trans-continental distances, many such costly electrical amplifications were required. Moreover, because of the incessant demand for bandwidth, the single-channel links were forced to higher and higher bit rates. This basically involved modulating the optical signal more rapidly.

With the invention of the erbium-doped fiber amplifier (EDFA), the nature of the optical fiber link drastically changed. First, amplification could be performed optically, independent of data transmission format and without the need for signal conversion. Another important consequence of EDFAs was the possibility of equal link gain for a significant range of optical transmission wavelengths.

This invention has caused wavelength-division multiplexing (WDM) to become the prevalent transmission format around the globe. This format is conceptually equivalent to the use of several single-channel transmitters and receivers at various wavelengths on a single optical fiber link. In this manner, the capacity of the link is only limited by the total optical bandwidth of the amplifier (or the fiber, were the amplifier improved), and the minimum optical bandwidth separating adjacent channels.

Unfortunately, today's communications demands have strained even current high-capacity WDM links, and research is currently aimed at increasing the bandwidth of the EDFA. Typical EDFAs have approximately 32 nm of conventional bandwidth (1530–1562 nm), and a recent result of research is the long-band amplifier, from ~1570–1610 nm. Beyond this improvement, however, little may be achieved due to the physics underlying the optical transitions of the $Er^{+3}$ dopant. As a result, new materials will be required to move to shorter ranges, such as 1500 nm and below. Other rare-earth dopants, including holmium and praseodymium, have been investigated for use as optical amplifiers, but their success in providing gain over a large bandwidth has been limited.

One possibility for an optical amplifier which provides gain over a large bandwidth is Raman amplification, since it could provide up to 300 nm of bandwidth. Raman amplification, however, generally requires large pump powers (>1W for a fiber <100 m long), which poses a challenge in telecommunications systems.

Transition metals have long been used as optically active dopants in crystalline hosts because they fluoresce in the near infrared (1000–1500 nm) region, while exhibiting a correspondingly large bandwidth. For example, $Cr^{4+}$doped crystals that are capable of lasing near 1.3 μm are disclosed in U.S. Pat. No. 4,987,575 to Alfano et al. Another example is titanium-doped sapphire (Ti:Al$_2$O$_3$), which provides optical gain in the range of about 650–1100 nm.

Given the useful wavelength range and bandwidth of many transitions metal dopants, their application to telecommunications is straightforward. Since the primary telecommunications medium is glass-based optical fiber however, the crystalline-host transition metal technology of U.S. Pat. No. 4,987,575 is not suited for this application. While a natural extension would be the inclusion of transition metal dopants into glasses, their performance (particularly their efficiency) has unfortunately been found to degrade in amorphous hosts, where the crystal field strength is much smaller than single-crystal hosts.

Another approach has been considered by Alfano et al. in U.S. Pat. No. 5,717,517 whereby the laser-active Cr$^{+4}$ (or V$^{+3}$)-doped crystal is manufactured as a plurality of particles, to be dispersed in a "non-gaseous" medium. In this manner, the dopants remain laser-active within a crystalline host while the larger, surrounding medium is compatible with fiber optic technology. In order to minimize the optical losses from such a composite medium, both the particles and their index difference from the surrounding medium must be small. These requirements were recognized in U.S. Pat. No. 5,717,517, and the particle size was therefore stipulated to be between 0.05 and 500 $\mu$m, while the index mismatch was specified to be lower than 0.1.

While the concept of dispersing crystalline particles in an amorphous medium is valid, this technology has several severe drawbacks, primary of which is the manufacture of the microscopic particles. Certainly the loss decreases with particle size, and the smallest particles (0.05 $\mu$m) are therefore desirable. Grinding of material generally has difficulty producing particles smaller than 1 $\mu$m and even the sol-gel method of producing forsterite has trouble attaining particles smaller than this size. While some techniques have attained particles on the 0.5 $\mu$m scale, another order of magnitude smaller seems optimistic at best.

Even allowing for the smallest particle size of 0.05 $\mu$m, a simple analysis of the scattering losses reveals another major shortcoming of this technique. Rayleigh scattering from randomly distributed particles can be calculated by $$\frac{P_{scat}}{P_{in}} = \frac{24\pi^3 V^2 N}{\lambda^4}\left(\frac{m^2-1}{m^2+2}\right).$$

Here scattered power is expressed as a ratio of the input power, and $\lambda$ represents the light wavelength, V the volume of the scattering particles, N the number of scattering particles, and m the ratio of particle index to surrounding medium index (i.e., the index mismatch ratio). With 0.05 $\mu$m particles of Cr$^{+4}$-doped forsterite making up 25% of the overall medium for example, the loss using the above equation is >10 dB/m at a wavelength of 1.3 $\mu$m for index differences greater than 0.0005.

Moreover, since all olivines, including forsterite, are birefringent (meaning different axes of the crystal have different indices of refraction), such crystals can never be index-matched in all directions. In the case of forsterite, the index mismatch can therefore be 0.03, resulting in losses higher than 300 dB/m. Using the published optical constants for forsterite, the maximum achievable gain (complete population inversion) for a material with 25% crystalline particles would be only about 240 dB/m. This demonstrates that gain would not even be possible using forsterite and the technique of U.S. Pat. No. 5,717,517. The term "dB" as used herein is the standard optical definition as 10×log$_{10}$ (P$_{out}$/P$_{in}$).

To overcome the shortcomings of the aforementioned materials and techniques, this invention describes a new class of materials, comprising a transition-metal doped glass in which extremely small crystals are internally nucleated. The process of internal nucleation forms a material called a glass-ceramic, where the crystals are less than 50 nm in size, uniformly distributed throughout the glass. The crystals are formed from constituent materials of the original glass melt, not by introducing new material as disclosed in U.S. Pat. No. 5,717,517. Moreover, the transition metal dopants are introduced into the entire medium, not just the crystals. The process of ceramming simply activates some of the omnipresent transition-metal dopant by forming a local crystal site into which the dopant is incorporated.

This doped, glass-ceramic material offers several advantages over the other, previously mentioned, transition-metal doped hosts. For example, because the crystalline phase within the biphasic glass-ceramic material is formed through controlled nucleation of the base glass, the crystalline phase has a smaller size and more uniform distribution than that obtained with other external preparation techniques. This minimizes light scattering loss (<50 dB/m for index mismatches up to 0.01, according to the above equation).

Another object of the invention is to provide a uniformly transition-metal-doped, glass-ceramic gain medium comprising internally-nucleated crystals within the amorphous glass matrix, where the crystals have a size of less than 50 nm. The transition metal dopant is introduced into the entire constituent glass, and may be present in both phases of the glass-ceramic medium. It is active only within the crystal sites, and is capable of providing gain at wavelengths within the range of about 900 to 3000 nm.

It is an object of the invention to provide transition metal doped, glass-ceramic gain media that exhibit properties that make them useful as optical amplifiers or laser oscillators.

Another object of the invention is to provide glass-ceramic gain media that can provide optical gain across a wavelength range of 900–3000 nm.

A further object of the invention is to provide glass-ceramic gain media in the form of optical fiber, planar waveguide structures, bulk gain media, or any other elongated-core geometry.

A further object of the invention is to provide glass-ceramic gain media in the core of the optical fiber, planar waveguide structures, or bulk gain media.

A further object of the invention is to provide glass-ceramic gain media in the cladding of the optical fiber or planar waveguide structures.

A further object of the invention is to provide glass-ceramic gain media that require lower amounts of pump power than Raman amplification to produce a similar amount of gain.

A further object of the invention is to provide glass-ceramic gain media that have passive losses (i.e., scattering and parasitic absorption) lower than 200 dB/m, and smaller than the maximum achievable gain of the particular transition metal dopant within the crystalline sites.

A further object of the invention is to provide glass-ceramic gain media that amplify either continuous-wave (CW) or pulsed signal light.

A further object of the invention is to provide glass-ceramic laser gain media that produce either continuous-wave (CW) or pulsed (modelocked, Q-switched, or any combination therein) optical output radiation when configured as a laser oscillator.

Another object of the invention is to provide a uniformly transition-metal-doped, glass-ceramic gain medium comprising internally-nucleated crystalline sites within the amorphous glass matrix, where the crystalline sites have a size of less than 50 nm. The transition metal dopant is introduced into the entire constituent glass, and may be present in both phases of the glass-ceramic medium. It is active only within the crystalline site, and is capable of providing gain at wavelengths within the range of about 900 to 3000 nm.

SUMMARY OF THE INVENTION

The invention resides in part in a gain medium in an optical amplifier or a laser oscillator that comprises a transition-metal doped glass-ceramic material with a passive loss less than 200 dB/m, comprising a crystal phase and a glass phase, the crystal phase being formed in situ in the glass phase and having a size of less than 50 nm, within which the transition metal dopants are capable of lasing at a wavelength within the range of about 900 to 1700 nm.

The invention further resides in an optical signal device comprising a gain medium having an elongated core, a cladding axially surrounding the elongated core and having a lower refractive index than the core, the core, the cladding, or both comprising a transition metal doped, glass-ceramic material with a passive loss less than 200 dB/m, having a crystal phase formed, and uniformly dispersed, within a glass phase, the crystal having a size less than 50 nm, the device further comprising means for pumping the transition doped glass-ceramic material to excite the transition metal ions.

The invention also resides in a method of generating a signal of light by laser radiation, or amplifying the generated signal of light, comprising the steps of:

(a) providing a gain medium having an elongated core and a cladding axially surrounding the elongated core, the material of the cladding having a lower refractive index than the material of the core, either the elongated core, the cladding, or both being a glass-ceramic material doped with a transition-metal, the doped, glass-ceramic material having a passive loss less than 200 dB/m and having a crystal phase and a glass phase, the crystal phase being formed in situ within the glass phase, being uniformly dispersed therein, the crystals having a size less than 50 nm, and at least a portion of the transition metal dopant being incorporated in the crystals within which the transition metal dopant is capable of lasing at the desired light signal wavelength, and (b) pumping the glass-ceramic material of the core, the cladding, or both so as to excite the transition metal ions.

DESCRIPTION OF THE PREFERRED EMBODIMENTS

Figure 1:
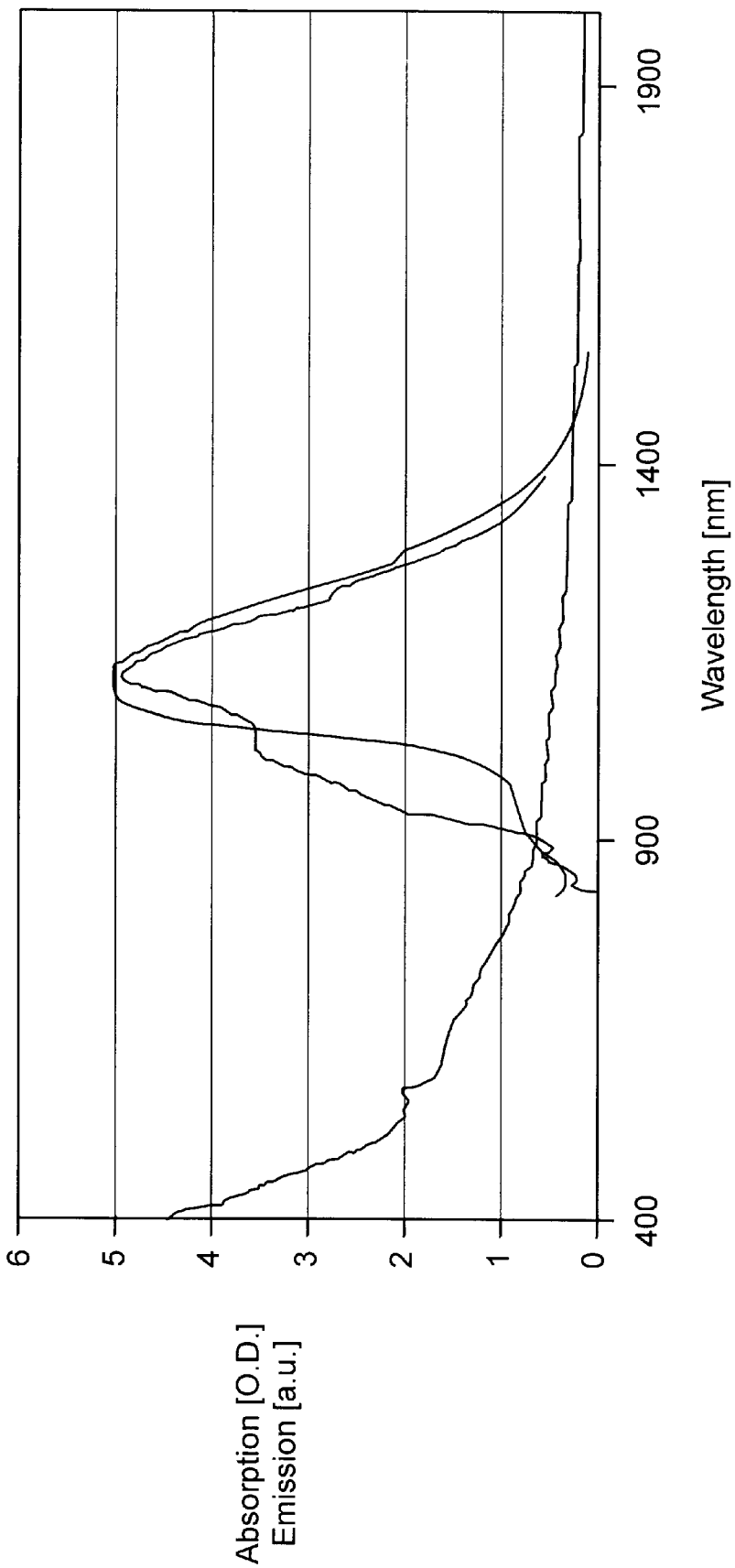
FIG. 1 illustrates the absorption and emission spectra for forsterite glass-ceramics doped with $Cr^{4+}$.

The glass-ceramic materials used as the gain media of the present invention are essentially multiphasic solids comprised of internally-nucleated, uniformly-spaced crystals in a matrix of glass. The glass-ceramic materials are formed by the controlled nucleation and crystallization of precursor glasses by means of suitable heat treatments tailored to the specific precursor glass. In general, the method of making the glass-ceramic materials comprises the steps of melting the precursor glass components, cooling the melt to a temperature at least below the transformation range of the melt, while simultaneously forming the melt into a glass body having the desired shape, and then heating the glass body in a controlled manner to a temperature above the transformation range of the glass to generate crystals in situ. Usually, the glass body is exposed to a two-stage heat treatment: a nucleation stage where the glass is heated to a temperature within, or just above, the transformation range for a sufficient time to promote nucleation, followed by a growth stage where the temperature is raised to levels approaching or even exceeding the softening point of the glass to cause the growth of crystals on the previously formed nuclei.

The crystals formed through internal nucleation are less than 50 nm, and preferably as low as 10–30 nm, in size, resulting in optically transparent, glass-ceramic materials. Moreover, the internally nucleated crystals have a very narrow particle size distribution and a highly uniform dispersion throughout the glass phase.

Consequently, the transition metals within the crystals in the glass-ceramic material are optically active. In general, any crystal that promotes the incorporation of an optically active transition metal within the crystal structure is contemplated for use as the crystal phase of the glass-ceramic material. Preferred crystals for the crystal phase include forsterite ($Mg_2SiO_4$), monticellite ($CaMgSiO_4$), alpha and/or beta-willemite ($Zn_2SiO_4$), YAG (yttrium aluminum garnet, $Y_3Al_5O_{12}$) lithium-germanate crystals, lithium-magnesium orthosilicates, and lithium-zinc orthosilicates.

The precursor glass compositions are tailored such that the transition metal preferentially partitions into the crystals during nucleation, as opposed to remaining in the glass phase. Copending applications entitled "Transition Metal Glass-Ceramics" by George H. Beall et al., "Transparent Glass-Ceramics Based on Alpha and Beta-Willemite" by Linda R. Pinckney, "Transparent Forsterite Glass-Ceramics" by George H. Beall, and "Transparent Lithium Zinc Magnesium Orthosilicate Glass-Ceramics" by George H. Beall and Linda R. Pinckney, all of which are assigned to the present assignee, explain in further detail the compositions and methods of making transition metal doped glass-ceramic materials that are useful as the gain media of the present invention. Those disclosures are herein incorporated by reference in their entirety.

The optically active, transition metal dopants that are contemplated for use in the glass-ceramic gain media are those transition metals which, when within a crystal host, are capable of providing gain or lasing at a wavelength in the range of about 900 to about 3000 nm. Preferably, the optically active transition metal is selected from the group consisting of $V^{3+}$, $Cr^{3+}$, $Cr^{4+}$, $Co^{2+}$, $Fe^{2+}$, $Ni^{2+}$ and $Ti^{3+}$ transition metal ions. Particularly useful glass ceramic materials, exhibiting properties that render them potentially suitable for use as gain media in optical amplifiers, include those where the crystals are comprised of forsterite, monticellite, and willemite, with $Cr^{4+}$ as the optically active ion. Alternatively, the crystals can be lithium-germanate and $Cr^{3+}$ can be the optically active ion.

The transition metal doped glass-ceramic materials can be used as the gain media in a variety of elongated-core applications. One useful and attractive format for such materials is in the form of an optical fiber in optical amplifiers and fiber lasers. Other formats include planar waveguides and bulk gain media, also for use in optical amplifiers and laser oscillators.

The bulk gain media format comprises an elongated sample of transition-metal doped glass-ceramic having a cross-sectional area larger than $1 \times 10^{-12}$ meter$^2$ and a length of 1–1000 mm.

The optical fiber and planar waveguide formats comprise an elongated core and a compatible covering or cladding of relatively lower index than the core that axially surrounds the core. The length of the structure and the diameter of its core and cladding will vary depending upon the application. Suitable lengths can range from about 1 cm to about 100 m, while suitable diameters for the core can range from about 1 μm to about 100 μm.

The optical fiber and planar waveguide formats subsequently have several variations in gain composition. In one variation, the elongated core is comprised of the transition-metal doped glass-ceramic, with the cladding comprised of a lower-index glass or glass-ceramic. Another format comprises placing the transition-metal doped glass-ceramic in the cladding of the optical fiber, leaving the core undoped. This latter scheme can take advantage of the cladding-pumping technique, shown in many cases to provide optimal output powers. The larger cladding can be better matched to the large-area output of many commercial, high-output power pump lasers. A third format comprises transition-metal doped glass-ceramic in both the core and cladding, where the index difference between the two regions is still sufficient to act as a waveguide.

The optical fiber may be formed, for example, by drawing a precursor glass core, that is clad with a compatible glass material, until the desired shape of the fiber is obtained. Then the precursor glass core and cladding are subjected to a thermal treatment procedure tailored to the specific glass compositions to form the desired crystals within the materials. Planar waveguides may be fabricated through deposition, etching, or radiation-writing techniques, producing a planar core and cladding structure. The structure is then subjected to a heat treatment procedure to produce the desired crystals within the desired materials. The heat treatments comprise thermal treatment of the entire sample, or selective heating of specific parts of the structure by focused radiation.

The elongated core structures, and their variations described above, are advantageously used as the gain media in either optical amplifiers or laser oscillators. These two applications are described below.

The optical amplifier comprises the elongated core glass-ceramic gain medium and a means for pumping the crystalline phase within the medium so as to excite the active transition-metal ions in the crystal sites. The means for pumping typically comprises a light source which may be a semiconductor laser, a solid-state laser, a gas laser, a dye laser, or a flashlamp which emits radiation at a wavelength within the absorption region of the transition-metal dopants.

The amplifier further comprises some means for coupling both the signal and pump light onto the elongated core structure, either bulk optics or other waveguide structures, such as couplers. The pump light propagates into the core or cladding, whichever is the preferred optically active part of the optical fiber. The light emitted by the transition-metal ions passes through the fiber core and thereby provides gain to the signal propagating through the fiber. The signal light may be either pulsed or continuous wave (CW).

The laser oscillator comprises the glass-ceramic gain medium, a means for pumping the crystalline phase within the medium so as to excite the active transition-metal ions in the crystal sites, and a feedback mechanism for producing laser oscillation. The means for pumping typically comprises a light source which may be a semiconductor laser, a solid-state laser, a gas laser, a dye laser, or a flashlamp which emits radiation at a wavelength within the absorption region of the transition-metal dopants. The feedback mechanism comprises reflective surfaces which repeatedly re-direct the optical radiation from the gain medium back through the gain medium, so as to induce laser oscillation. The laser cavity often also comprises focusing elements which comprise lenses or curved reflecting surfaces. Alternately, the focusing elements can comprise the gain media itself, which often acts as a thermal lens with significant pumping. The reflective surfaces comprise bulk mirrors, which may be of varying reflectivities at the signal wavelength, simply reflecting enough of the light to keep the total gain of the cavity higher than the total loss. Alternately, the reflecting surfaces comprise a cleaved or polished surface of the elongated core gain medium itself. Laser radiation (output) exits the laser cavity from any of the reflecting or focusing surfaces, wherever imperfect (<100%) reflection occurs.

The laser oscillator is operated in a continuous-wave (CW) fashion, where the radiation emitted from the laser cavity is substantially constant with time.

Alternately, the laser oscillator is operated in a modelocked configuration, where multiple longitudinal modes of the laser cavity are phase-locked and thereby produce an output of repetitive pulses, separated in time by the round-trip propagation time of light through the laser cavity. Such modelocking is achieved through several methods, including active and passive techniques. Active techniques comprise acousto-optic (AO) modulation, electro-optic modulation, and sync-pumping, while passive techniques comprise Kerr-lens modelocking (KLM), regenerative modelocking, colliding-pulse modelocking, and additive-pulse modelocking.

Alternately, the laser is operated in a Q-switched configuration, where the loss of the cavity is controlled such that energy from the pump is stored in the gain medium for some period of time, then the amassed energy is released over a short interval of time. As a result, the laser produces high-energy output pulses, separated by the cycle time of the energy storage/release sequence. The Q-switching mechanism comprises saturable absorbing media, electro-optic modulators, acousto-optic modulators, and oscillating bulk optics.

Alternately, the laser is operated in any combination of the above formats: CW, modelocked, and Q-switched.

Figure 2:
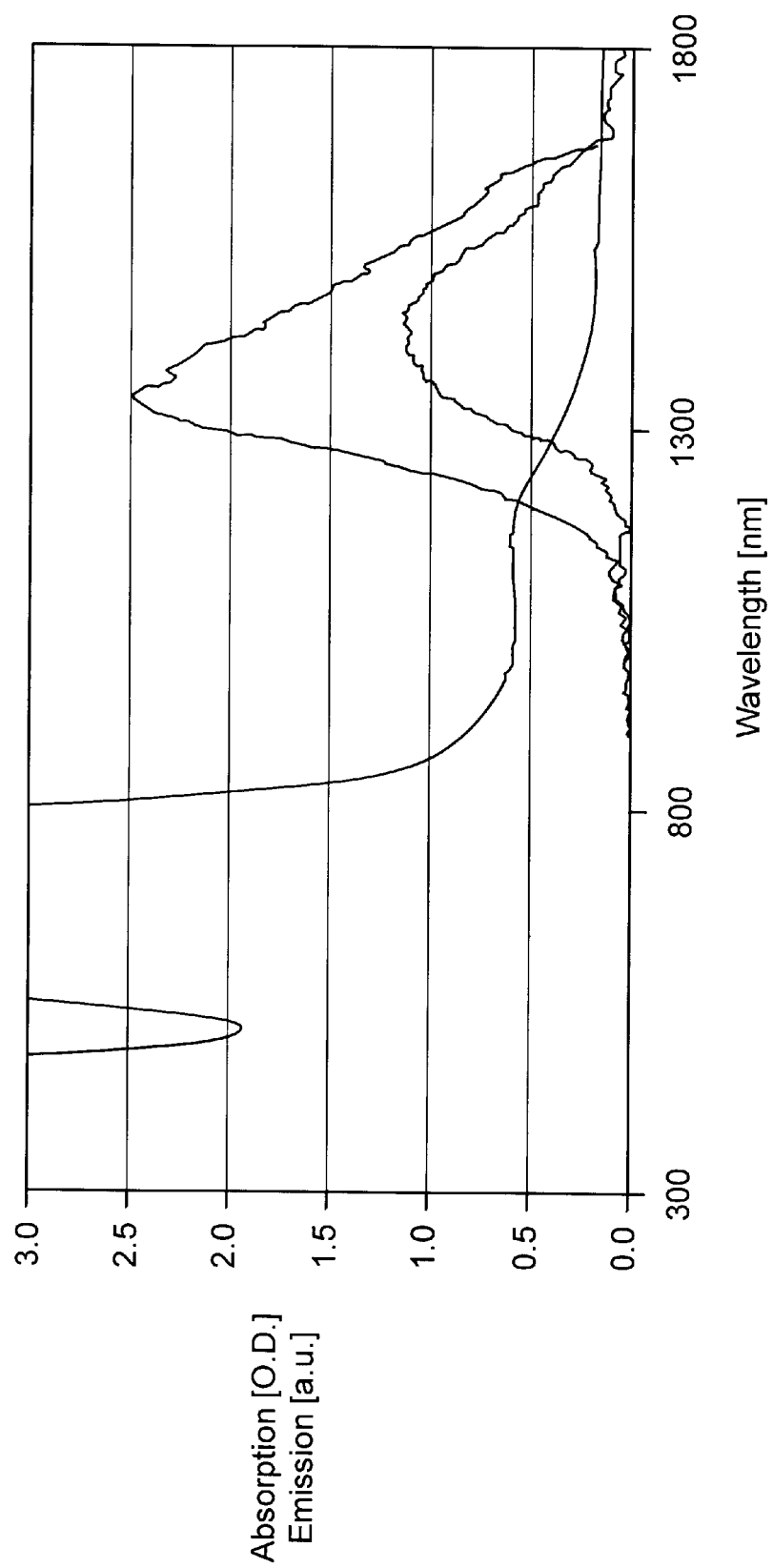
FIG. 2 illustrates the absorption and emission spectra for willemite glass-glass-ceramics doped with $Cr^{4+}$.
Figure 3:
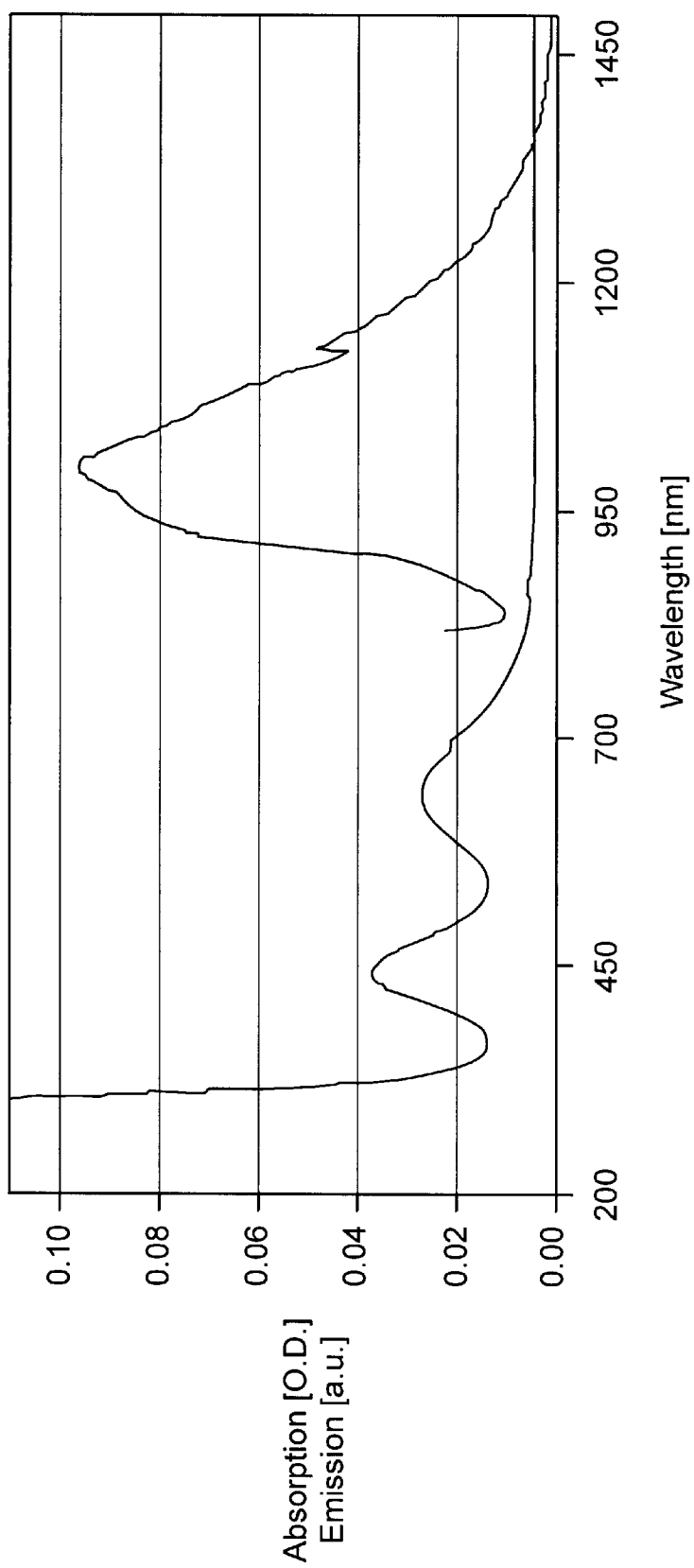
FIG. 3 illustrates the absorption and emission spectra for lithium-germanate glass-ceramics doped with $Cr^{4+}$.

The emission spectra for examples of transition-metal doped glass-ceramic materials that generate fluorescence at the desirable wavelengths in the spectral region of approximately 900 to 1700 nm are illustrated in FIGS. 1–3.

FIG. 1 shows the absorption and emission spectra of $Cr^{4+}$: forsterite glass-ceramic, and FIG. 2 shows the absorption and emission spectra of $Cr^{4+}$: willemite. As clearly demonstrated from the spectra, $Cr^{4+}$: forsterite emits at wavelengths ranging from about 900 nm to about 1400 nm, with a peak emission at about 1150, while $Cr^{4+}$: willemite emits at wavelengths ranging from about 1100 nm to about 1700 nm. These emissions encompass the conventional band of 1530–1560 nm and demonstrate broadband emission in the short band (i.e. below 1500 nm) wavelength range. From these spectra it is evident that glass-ceramic materials comprising $Cr^{4+}$ dopant could open the gain window from 1100–1700 nm, corresponding to an order of magnitude increase in bandwidth over the current erbium technology. $Cr^{4+}$: willemite, for example, could alone cover a wavelength range of 1200–1650 nm. Moreover, because the $Cr^{4+}$ absorption band stretches from about 800 to about 1150 nm, an optical amplifier that incorporates the $Cr^{4+}$ doped glass-ceramic material can be pumped with a variety of standard laser pumps, including the standard 980 nm laser diode, and a neodymium-doped fiber laser pump. In addition, because the absorption band for these materials overlaps most of the current high-power laser diode source emissions wavelengths, $Cr^{4+}$ glass-ceramics could be used as new pump sources, converting standard laser diode output to other useful wavelengths.

FIG. 3 illustrates the absorption and emission spectra for another glass-ceramic material—$Cr^{3+}$ doped lithium-germanate. As the spectra show, these materials exhibit a broad emission centered around 980 nm, which is currently the most popular erbium amplifier pump wavelength. These materials could therefore be pumped with a cost-effective 810 nm GaAs diode pump laser and function as a 980 nm fiber-based pump for an erbium amplifier, thereby providing a cost-effective pump laser at the 980 nm wavelength.

While the invention has been described in connection with one or more preferred embodiments, it will be understood that the invention is not limited to those embodiments. On the contrary, the invention includes all alternatives, modifications, and equivalents as may be included within the spirit and the scope of the appended claims.

What is claimed is:

1. A gain medium for use in optical amplifiers or laser oscillators, comprising a transition-metal-doped glass-ceramic material with a passive loss less than 200 dB/m, said glass-ceramic material comprising a crystal phase and a glass phase, said crystal phase, with crystals having a size of less than about 50 nm, is formed in situ and uniformly distributed in said glass phase, and transition metal ions are doped within said crystals and are capable of lasing at a wavelength within a range of about 900 nm to about 1700 nm.

2. The gain medium according to claim 1, wherein the passive loss is less than about 20 dB/m.

3. The gain medium according to claim 1, wherein the passive loss is less than about 2 dB/m.

4. The gain medium according to claim 1, wherein the crystals contain a transition metal ion selected from a group consisting of $V^{3+}$, $Cr^{3+}$, $Cr^{4+}$, $Co^{2+}$, $Fe^{2+}$, $Ni^{2+}$, and $Ti^{3+}$.

5. The gain medium according to claim 4, wherein the crystals contain $Cr^{4+}$ dopant.

6. The gain medium according to claim 5, wherein the crystals doped with $Cr^{4+}$ belong to a group consisting of forsterite, monticellite, willemite, akermanite, diopside, yttrium aluminum garnet (YAG), and mixed lithium-zinc-magnesium orthosilicates.

7. The gain medium according to claim 4, wherein the crystals contain $Cr^{3+}$ dopant.

8. The gain medium according to claim 7, wherein the crystals are $Cr^{3+}$ doped lithium-germanate.

9. An optical signal device comprising:
a) a gain medium having (1) an elongated core, (2) a cladding axially surrounding the elongated core and having a lower refractive index than the core, (3) wherein either said core, said cladding, or both comprises a transition-metal-doped glass-ceramic material with a passive loss less than 200 dB/m, having a crystal phase formed and uniformly dispersed within a glass phase, crystals in said crystal phase having a size less than about 50 nm, and transition metals doped within said glass-ceramic material are capable of lasing at the same wavelength as a signal of light;
b) a means for pumping said transition-metal-doped glass-ceramic material to excite transition metal ions.

10. The optical signal device according to claim 9, wherein the device is an amplifier that amplifies a signal of light.

11. The optical signal device according to claim 9, wherein the device is a laser oscillator that produces a signal of coherent radiation.

12. The optical signal device according to claim 9, wherein the elongated core of the gain medium is formed of said transition-metal-doped glass-ceramic material.

13. The optical signal device according to claim 9, wherein the cladding on the elongated core of the gain medium is formed of said transition-metal-doped glass-ceramic material.

14. The optical signal device according to claim 9, wherein both the elongated core and the cladding of the gain medium are formed of said transition-metal-doped glass-ceramic material.

15. The optical signal device according to claim 9, wherein said crystals are doped with transition metal ions selected from a group consisting of $V^{3+}$, $Cr^{3+}$, $Cr^{4+}$, $Co^{2+}$, $Fe^{2+}$, $Ni^{2+}$, and $Ti^{3+}$.

16. The optical signal device according to claim 15, wherein said transition metal ion is $Cr^{4+}$.

17. The optical signal device according to claim 16, wherein the crystals doped with $Cr^{4+}$ belong to a group consisting of forsterite, monticellite, willemite, akermanite, diopside, yttrium aluminum garnet (YAG), and mixed lithium-zinc-magnesium orthosilicates.

18. The optical signal device according to claim 15, wherein the crystals contain $Cr^{3+}$ dopant.

19. The optical signal device according to claim 18, wherein the crystals are $Cr^{3+}$ doped lithium-germanate.

20. The amplifier according to claim 10, wherein the signal of light is a pulsed signal.

21. The amplifier according to claim 10, wherein the signal of light is a continuous wave signal.

22. The amplifier according to claim 10, wherein the signal of light has a wavelength within a range of about 900 nm to about 3000 nm.

23. The amplifier according to claim 10, wherein the means for pumping emits in the absorption region of said transition metal ions and comprises a semiconductor laser, a solid-state laser, a gas laser, a dye laser, or a flashlamp.

24. The laser oscillator according to claim 11, wherein an output radiation is a continuous wave signal.

25. The laser oscillator according to claim 11, wherein an output radiation is a periodic series of modelocked pulses.

26. The laser oscillator according to claim 11, wherein an output radiation is a periodic series of Q-switched pulses.

27. The laser oscillator according to claim 11, wherein an output radiation is a periodic series of modelocked, Q-switched pulses.

28. The laser oscillator according to claim 11, wherein an output radiation has a wavelength within a range of about 900 nm to about 3000 nm.

29. The laser oscillator according to claim 11, wherein said means for pumping emits in the absorption region of said transition metal ions and comprises a semiconductor laser, a solid-state laser, a gas laser, a dye laser, or a flashlamp.

30. A method of generating a signal of light by laser radiation, said method comprises the steps of: (a) providing a gain medium having an elongated core and a cladding axially surrounding said elongated core, said cladding having a lower refractive index than said core, said core, said cladding or both being made from a glass-ceramic material doped with transition metal ions having a passive loss less than 200 dB/m and having a crystal phase and a glass phase, said crystal phase, with crystals having a size less than about 50 nm, is formed in situ and uniformly dispersed within said glass phase, and at least a portion of said transition metal ions are incorporated into said crystals and are capable of lasing at a desired light signal wavelength, and (b) pumping said glass ceramic-material so as to excite said transition metal ions.

31. The method according to claim 30, further comprises amplifying a signal of light by transmitting said signal of light through the glass-ceramic material while said transition metal ions are in an excited state.

32. The method according to claim 30, further comprises creating a feedback for optical radiation on both sides of said gain medium, wherein said feedback is generated by a reflecting surface that redirects said radiation back and forth through said gain medium such that overall gain exceeds overall loss, and providing focusing elements.

33. The method according to claim 30, wherein said crystals are doped with transition metal ions selected from a group consisting of $V^{3+}$, $Cr^{3+}$, $Cr^{4+}$, $Co^{2+}$, $Fe^{2+}$, $Ni^{2+}$, and $Ti^{3+}$.

34. The method according to claim 30, wherein said signal of light is a pulsed signal.

35. The method according to claim 30, wherein said signal of light is a continuous wave signal.

36. The method according to claim 30, wherein said signal of light has a wavelength within a range of about 900 nm to about 3000 nm.

37. The method according to claim 30, wherein said means for pumping emits in the absorption region of said transition metal ions and comprises a semiconductor laser, a solid-state laser, a gas laser, a dye laser, or a flashlamp.

38. The method according to claim 30, wherein an output radiation is a periodic series of modelocked pulses.

39. The method according to claim 30, wherein an output radiation is a periodic series of Q-switched pulses.

40. The method according to claim 30, wherein an output radiation is a periodic series of modelocked, Q-switched pulses.

41. The gain medium according to claim 1, wherein said crystals have a size of about 10 nm to about 30 nm.

42. The optical signal device according to claim 9, wherein said crystals have a size of about 10 nm to about 30 nm.

43. The method according to claim 30, wherein said crystals have a size of about 10 nm to about 30 nm.

* * * * *